(No Model.)

E. T. STARR.
SECONDARY BATTERY.

No. 267,275. Patented Nov. 7, 1882.

WITNESSES
Wm A. Skirkle.
F. D. Shoemaker.

INVENTOR,
Eli T. Starr,
By his Attorneys
Baldwin, Hopkins & Peyton

N. PETERS, Photo-Lithographer, Washington, D. C.

UNITED STATES PATENT OFFICE.

ELI T. STARR, OF PHILADELPHIA, PENNSYLVANIA.

SECONDARY BATTERY.

SPECIFICATION forming part of Letters Patent No. 267,275, dated November 7, 1882.

Application filed September 30, 1882. (No model.)

*To all whom it may concern:*

Be it known that I, ELI T. STARR, of the city and county of Philadelphia, in the State of Pennsylvania, have invented certain new and useful Improvements in Secondary Batteries, of which the following is a specification.

My invention relates to electric batteries of that class which generate no electricity of themselves, but which, when submitted to the action of an electric current from a suitable generator passing through the battery, become charged or put into condition to give off electric currents or energy upon connecting the poles of the battery by a conductor.

The object of my invention is to improve secondary-battery elements by imparting to them greater lightness, and by constructing them in a more economical manner while producing elements capable of large storage capacity within comparatively small space. To these ends I construct the elements or electrodes of secondary batteries of a composition of matter molded or united into a porous self-sustaining mass.

The subject-matter claimed herein as my invention is first specifically described in detail, and then particularly pointed out at the close of the specification.

Figure 1:
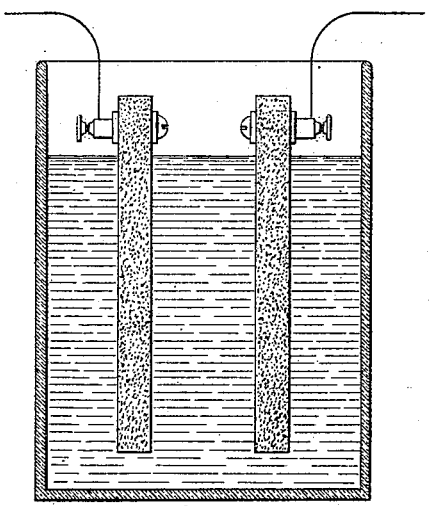
Figure 2:
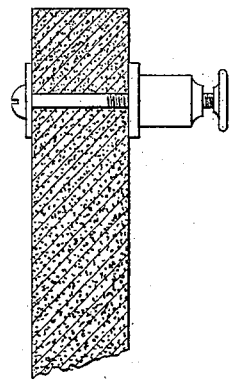

In the accompanying drawings, Figure 1 is a view in section of a secondary battery embodying elements or electrodes constructed according to my invention; and Fig. 2 is a section through one of such elements, showing one way of connecting the elements of the battery with the wires of the charging or working circuits thereof.

Heretofore the electrodes of secondary batteries have been constructed in various ways. The electrodes of the Planté type of battery consist of metal plates with their surfaces "formed" or rendered porous by electro-chemical action, so as to be capable of readily accumulating the energy of the charging-current. In the Percival type of battery the electrodes are composed of a mass of porous material supported by the sides of the battery-vessel, and divided by a partition or diaphragm, while in the Faure type of battery the electrodes consist of metal plates or supports to which are applied layers of porous active material—such, for instance, as oxide of lead. The Faure type of secondary battery is very efficacious by reason of the employment of the oxide or finely-divided lead.

As above stated, my invention consists in electrodes or elements of secondary batteries composed of a composition of matter formed or shaped into a self-sustaining porous mass, whereby the use of plates or the sides of the battery-vessel as supports for the porous layers or material as heretofore employed, is avoided, while the advantages and benefits of the porous active material are retained.

In carrying out my invention various compositions may be used to form the electrodes, and the shape they may be made to assume may also be varied.

A secondary-battery electrode or element embodying my invention may be constructed as follows: Take oxide of lead and thoroughly mix it with plaster-of-paris and water or finely-divided artificial-stone composition and water, so as to form a plastic mass. Place the mass thus composed in suitable molds, and subject the same to slight pressure. As soon as the mass constituting an electrode becomes dried or "set" it is preferable to electroplate the surfaces of the element with a suitable metal—such as copper or lead—in order to bind the mass more firmly together and render the element more substantial. I prefer the proportions of oxide of lead and plaster-of-paris and water or artificial-stone composition and water to be about equal in bulk; but the proportions may be considerably varied. There should be a sufficient quantity of the oxide or peroxide to constitute not only the porous active mass of the element, but also to constitute, to a considerable extent, an electric conductor.

Of course it will be understood that instead of oxide of lead or peroxide of lead any equivalent finely-divided active material may be employed, and such active material may be mixed with other materials than plaster-of-paris or artificial-stone composition, that are capable of becoming set or hardened with time or upon exposure to the air after being mixed to a plastic or fluid condition and molded into form.

I have said that it is preferable to submit the material which is to form the electrodes or elements to slight pressure in a mold; but the pressure is not absolutely necessary, though in some instances a better element is produced by such operation.

In order to afford a ready means of connecting the circuit connections or wires, whether of the charging or working circuit of the battery, with the porous-composition electrodes when assembled in the battery-vessel, and immersed, for instance, in dilute sulphuric acid, I preferably drill a hole into the upper end of the porous body and fasten the wires by means of a binding-screw fitted to said hole, as clearly shown in Fig. 2. It will be obvious, however, that the shape of the electrodes may be such as to afford ready means for connecting the wires, either with or without binding-screws or bolts, and that the connections may be made in various well-known ways.

I have thus described the best way now known to me of constructing a secondary-battery element of a composition of matter of which finely-divided active material suitable for secondary batteries is a constituent, when such composition is united into a porous self-sustaining body or plate by the binding action of a material, also a constituent of the composition, which may be brought to a fluid or plastic condition without the aid of artificial heat, and which sets or hardens into a porous self-sustaining body.

This application is a division of my application filed July 24, 1882, in favor of which I hereby disclaim any and all patentable subject-matter of my invention save that specifically recited in the following claims:

What I claim herein as of my invention is—

1. A secondary-battery element constructed of a mixture of finely-divided active material with a material which sets or hardens after being brought to a plastic or fluid condition, substantially as described.

2. The method of forming secondary-battery elements hereinbefore set forth, which consists in mixing finely-divided active material with a non-active material which sets or hardens after being brought to a plastic or fluid condition without the application of artificial heat, substantially as described.

In testimony whereof I have hereunto subscribed my name this 29th day of September, A. D. 1882.

ELI T. STARR.

Witnesses:
WM. J. PEYTON,
E. EUGENE STARR.